(12) United States Patent
Jain et al.

(10) Patent No.: US 8,481,455 B1
(45) Date of Patent: Jul. 9, 2013

(54) $SO_3$ RESISTANT SORBENTS FOR REMOVING MERCURY FROM FLUE GAS

(75) Inventors: Mohit Jain, East Brunswick, NJ (US); Ganesh Skandan, Easton, PA (US)

(73) Assignee: NEI Corporation, Somerset, NJ (US)

( * ) Notice: Subject to any disclaimer, the term of this patent is extended or adjusted under 35 U.S.C. 154(b) by 129 days.

(21) Appl. No.: 13/033,482

(22) Filed: Feb. 23, 2011

Related U.S. Application Data

(60) Provisional application No. 61/307,616, filed on Feb. 24, 2010.

(51) Int. Cl.
*C01B 31/08* (2006.01)
*B01J 20/00* (2006.01)
*B32B 5/16* (2006.01)
*B32B 9/00* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)

(52) U.S. Cl.
USPC ............................ 502/417; 502/400; 428/403

(58) Field of Classification Search
USPC .. 502/400, 407–413, 415–417, 425; 423/210, 423/228, 229, 230, 231; 210/688, 914; 428/357, 428/403, 404
See application file for complete search history.

(56) References Cited

U.S. PATENT DOCUMENTS

| | | | | |
|---|---|---|---|---|
| 5,916,934 | A * | 6/1999 | Mahmud et al. | 523/215 |
| 6,541,113 | B1 * | 4/2003 | Tu et al. | 428/403 |
| 2006/0199917 | A1 * | 9/2006 | Chino | 525/374 |
| 2008/0026210 | A1 * | 1/2008 | Iijima et al. | 428/338 |

OTHER PUBLICATIONS

Zhu et al., "Enhanced mercury ion adsorption by amine-modified activated carbon", Journal of Hazardous Materials 106 (2009) 866-872. Available online Dec. 3, 2008.*

* cited by examiner

*Primary Examiner* — Anthony J Zimmer
(74) *Attorney, Agent, or Firm* — William L. Botjer

(57) ABSTRACT

Surface functionalized sorbent particles for vapor-phase mercury removal, especially in the presence of $SO_3$ in, for example, flue gas. The sorbent surface is modified to increase the $SO_3$ resistance of vapor-phase mercury sorbents. The mercury removal efficiency is immune to the presence of $SO_3$, which is not the case with conventional activated carbon as well as brominated activated carbons. The sorbent is based on carbon particles with a metal oxide coating on the surface. The thin metal oxide layer acts as an amenable surface to introduce functional groups. The metal oxide coated carbon was further modified with amine molecules, to increase its resistance towards $SO_3$ poisoning.

16 Claims, 4 Drawing Sheets

US 8,481,455 B1

SO₃ RESISTANT SORBENTS FOR REMOVING MERCURY FROM FLUE GAS

CROSS REFERENCE TO RELATED APPLICATIONS

This application claims priority of U.S. provisional application No. 61/307,616 filed Feb. 24$^{th}$, 2010.

This application is related to U.S. application Ser. No. 12/776,577 filed May 26, 2010 titled "Nanoparticle Sorbent For Efficient Mercury Remediation from Contaminated Water" now U.S. Pat. No. 8,263,525 and U.S. application Ser. No. 13/042,716 filed Mar. 8, 2011 titled "Processes To Modify The Surface Of Activated Carbon To Render It More Effective For Mercury Removal From Flue Gas".

STATEMENT OF GOVERNMENT SUPPORT OF INVENTION

The work leading to the present application was done as part of DOE Grant Number: DE-FG02-07ER84714. The government has certain rights in the invention.

BACKGROUND OF THE INVENTION

Under the EPA's Clean Air Mercury Rule, coal fired power plants are required to drastically reduce the amount of mercury (Hg) emissions within the next several years. One of the technologies under consideration for removal of Hg is the use of chemically treated (brominated) activated carbon. However, currently used activated carbon is not resistant to $SO_3$ poisoning. It has been postulated that there are possible mechanisms of interaction of sulfur oxides with activated carbon. It is said that $SO_2$ and $SO_3$ compete with mercury for Lewis base sites on the surface of activated carbon. Further, the concentration of $SO_2$ (several pph to 1000 ppm) and $SO_3$ (1-10 s ppm) are significantly greater than mercury concentration (~1 ppb). Additionally, $SO_x$ molecules are kinetically and thermodynamically favored over mercury due to their strong binding energy to activated carbon. Activated carbon acts as a catalyst during the reaction between $SO_3$ and water to form sulfuric acid. $SO_3$ can also react with surface oxygen to form $H_2SO_4$. One of the possible solutions suggested others is to co-inject a basic sorbent with activated carbon. However, injection of two sorbents for the removal of mercury can significantly increase the cost of mercury removal.

Coal fired power plants constitute ~52% of the total electricity produced in United States. As the demand for electricity increases, Utility companies are increasing the generating capacity as well. Additionally, many of the current nuclear plants will be "retired" in the first quarter of the 21$^{st}$ century. Due to poor public support for nuclear energy, these nuclear plants are likely to be replaced by coal fired plants. At the current consumption rate, it is estimated that the world has ~1500 years of coal reserves. This leads to a steady increase in amount of coal consumed in the world and in the US. This implies that the mercury emission issue associated with coal-fired power plants needs to be resolved in the long run.

An estimated total of 48 tons of mercury is emitted every year in the US from coal-fired power plants, which is $\frac{1}{3}^{rd}$ of the total mercury emissions per year in the US. On a worldwide scale, this is a much larger issue, since countries such as China and India are using increasing amounts of energy derived from fossil fuels. Under the government's "Clear Skies Initiative", the target is to reduce mercury emission by about 45% by 2010, and about 70% by 2018. New technologies will need to be developed to reach these targets. According to the DoE, the market penetration for mercury emission reduction technologies is an estimated 320,000 megawatts. In order to achieve the target reduction by 2018, the additional annual cost for energy generation will be $2 to $6 billion per year, if the existing activated carbon technology is used (current estimate is $18,000-$131,000 per pound of mercury removal, using activated carbon).

Currently various types of activated carbons are being extensively studied for mercury removal from flue gas. DOE/NETL has carried out several field tests of activated carbons due to their high removal efficiency. Three prominent brands of activated carbons which have been tested in the field are NORIT Americas (Darco® Hg-LH), Alstom Power Plant Laboratories (Mer-Clean™), and Sorbent Technologies Corporation (B-PAC™). Results indicated that activated carbon consistently performed well in mercury removal, on a full-scale test. However, secondary pollution (bromine), corrosion from bromine and $SO_3$ resistance is still an issue, affecting their overall performance.

A study tested the performance of a commercial sorbent Darco Hg-LH, in the presence and absence of $SO_3$, at a 630 MW power plant. The mercury removal efficiency of Darco Hg-LH reduced from 75-90% mercury removal in the absence of $SO_3$, to 50-60% mercury removal in the presence of 5.4 ppm $SO_3$. The mercury removal efficiency reduced further to 33% in the presence of 10.7 ppm $SO_3$.

Another media which is used to remove mercury from flue gas is based on "clay", and is manufactured by Amended Silicates. However when the performance of this media was compared with various types of activated carbon sorbents the amended silicate media did not perform as well as activated carbon. Others used a fluidized bed of zeolite and activated carbon for the removal of organics and metals form gas streams. Zeolites are aluminosilicate materials that are extensively used as adsorbents for gas separation and purification, and they are also used as ion-exchange media for water treatment and purification. Zeolites have "open" crystal structures, constructed from tetrahedra ($TO_4$, where T=Si, Al). It has been observed that the removal efficiency of metals present in gases by activated carbon is higher than that of zeolite, and the temperature only slightly influences the removal efficiency. A study tested treated Zeolite and observed 63% mercury removal efficiency.

U.S. Pat. No. 6,610,263 is directed to the use of high surface area $MnO_x$ to remove Hg. It is claimed that it has the capability to remove 99% of elemental Hg and 94% of the total mercury content in flue gas. However, the cost is likely to be a concern for using this media in practical applications.

Biswas et-al [T. M. Owens and P. Biswas, J. Air & Waste Manage. Assoc., n46, 1996, p 530] have developed a gas-phase sorbent precursor method, where a high surface area agglomerated sorbent oxide particle is produced in situ in the combustor. These sorbents are stable at elevated temperatures and provide a surface of metallic vapors (for condensation) and reaction. They used titanium isopropoxide as precursor, which decomposed at elevated temperature and formed particles of titania. Hg vapors were found to condense on these particles in the presence of UV radiation which helps in the oxidation of mercury vapors and formation of a strong bond between mercury and titania. They [P. Biswas and M. Zachariah, "In situ immobilization of lead species in combustion environments by injection of gas phase silica sorbent precursors", Env. Sci. & Tech., v31, n9, 1997, p 2455] also used silica precursors for the removal of lead from flue gas, and were able to get 80-90% lead removal efficiency. The removal efficiency was found to be a function of the gas temperature. Additionally, the efficiency was observed to decrease with increase in temperature.

Another group have shown the feasibility of using a fluidized bed for the removal of metals, such as lead, from flue gas. They used limestone, bentonite, and alumina as sorbents, and observed that the effectiveness of the fluidized bed depends on sorbent species, sorbent particle size, the amount of sorbent used, metal to sorbent ratio, metal concentration in the waste, air velocity, and temperature. Smaller particles showed better efficiency compared to larger particles (particle range 400-700 µm). In case of limestone, it increased from 60% to 70% when the particle size was decreased from 700 to 500 µm, all other conditions remaining same. The sorbents showed better efficiency at lower temperatures (~750° C. vs. ~900° C.). This is because at higher temperatures, the vapor pressure is high, so more metal escapes as vapor.

Still others have used zeolite materials for the removal of mercury by duct injection. They were able to get between 45 and 92% metal removal depending upon the amount of sorbent injected and the type of sorbent. In the case of zeolites, there was no effect of temperature on the removal efficiency.

Gullet et-al [B. Gullet and K. Raghunathan, "Reduction of coal based metal emissions by furnace sorbent injection", Energy & Fuels, v8, 1994, p 1068] demonstrated the feasibility of using oxide minerals such as limestone, kaolinite, and bauxite as sorbents for toxic metal removal, by injecting them through the burner. They were able to get reduction in submicron size metal particles of antimony, arsenic, mercury, and selenium by hydrated lime and limestone.

SUMMARY OF THE INVENTION

The present invention is directed to $SO_3$-resistant sorbents for removing mercury from gas and their synthesis. The sorbent has a selectivity towards mercury adsorption and its mercury adsorption efficiency does not degrade significantly in the presence of $SO_3$. These sorbents are halogen (bromine) free, making them environmentally safe as well as non corrosive towards the power plant system. The majority of carbon based sorbents are not resistant to $SO_3$, in terms of their mercury adsorption efficiency. Certain of the non-activated carbon based sorbents, such as zeolites and oxides do not degrade in the presence of $SO_3$; however their mercury removal efficiency is significantly lower than activated carbon. The present invention overcomes the limitations of currently available carbon and non-carbon based sorbents by incorporation of thin metal oxide layer on the surface of carbon-based sorbents that is further modified so as to have amine groups.

The sorbent describes in the present invention is based on carbon particles with a metal-oxide layer on the surface, functionalized with amine groups. The metal-oxide layer is coated on the surface of carbon, using a solution-based method. The purpose of the metal-oxide layer is to provide a surface that allows basic functional groups such as amine to be bonded chemically on the surface of the sorbent. Amine groups are deposited by treating metal-oxide modified sorbent with amine containing compounds such as amino silane and octyl amine. The amine groups act as Lewis base and form adduct with $SO_3$, which is a strong Lewis acid. Thus, the presence of amino groups provides additional sites for the adsorption for $SO_3$, preventing $SO_3$ to be adsorbed on the sites that are preferred by mercury.

Two critical aspects that differentiate the newly developed carbon-based particles from other sorbent particles include: (i) tolerance to $SO_3$ poisoning compared to other sorbent being developed and used; (ii) suitable surface modification that leads to higher affinity for mercury without having to use toxic elements such as bromine, and (iii) highly accessible internal surface, and selectivity towards mercury adsorption.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Overview

Figure 1:
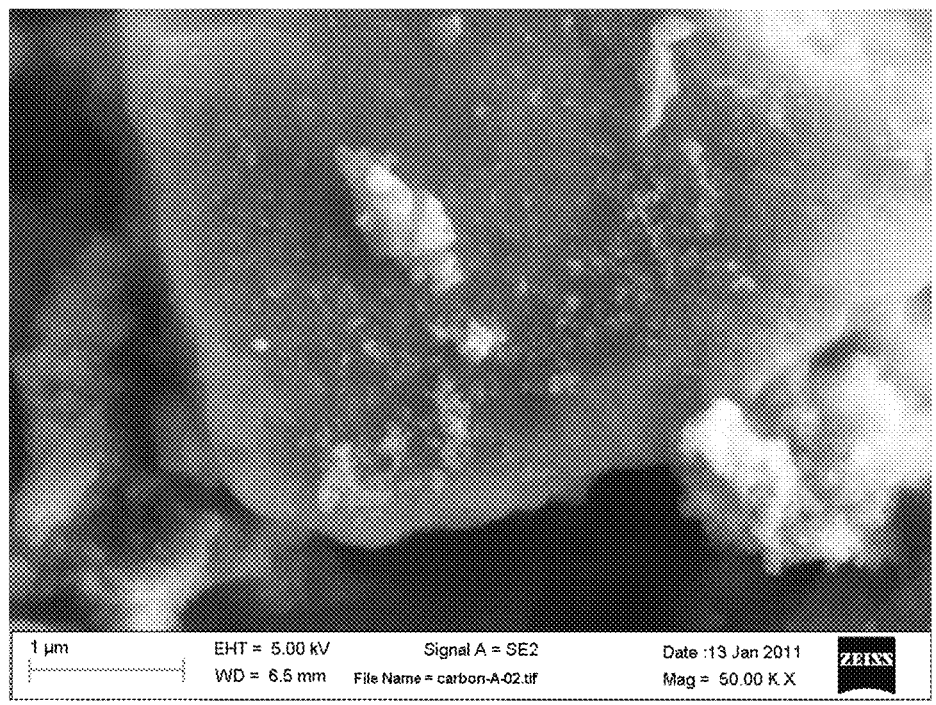
FIG. 1 is SEM micrograph of coated activated carbon

A. The template material used as a sorbent is high surface area activated carbon. It should be noted that carbon has been used as a template material in these experiments because it is readily available. Other types of carbon particles that have a similarly morphology can also be used such as carbon black. Additionally, other non-carbon materials, such as ceramic oxides, ceramic non-oxides, or clay-based particles can also be used as template for further surface modification.

B. The surface of the carbon particles was modified using a two-step process. During the first step, the surface was modified with aluminum hydroxide, to form a tie layer. This leads to the activation of the sorbent surface with aluminum hydroxide functional groups. In certain cases, especially in certain types of carbon particles, it may not be necessary to use a tie layer. An aqueous solution of sodium aluminate was used as the precursor for aluminum hydroxide deposition. Sodium aluminate was transformed to aluminum hydroxide, by treating it with an ion-exchange resin. The resin exchanges sodium ions to hydrogen ions. It should be noted that other inorganic compounds such as: titanium hydroxide, magnesium hydroxide, iron hydroxide, copper hydroxide can also be used as the tie layer prior to deposition of the metal oxide layer, described below.

C. The surface of carbon was further modified with a metal oxide, during the second step. In our work, we used silica because it is the least expensive among oxides and allows for easy surface modification. Other commonly known oxides, including aluminum oxide, titanium oxide, iron oxide and tin oxide can be used instead. Sodium silicate was used as silicon oxide source. An aqueous solution of sodium silicate was treated with ion-exchange resin to exchange sodium ions with hydrogen ions. The amount of silica on the surface of carbon is about 7-16% and preferably about 8-13% and more preferably about 10-12 wt %, of the total powder.

D. Silica coated carbon was further modified with 3-Aminopropylotriethoxysilane (APTS) or n-octylamine, to introduce amine groups on the surface of the coated particles to make them resistant to $SO_3$ poisoning. Note that a variety of different water soluble and water insoluble amine containing compounds can be used, instead of APTS or n-octylamine. Examples of these compounds include aliphatic amines, aromatic amines, among other amine containing compounds. Addition of amine was achieved by chemical boding (in the case of APTS) or adsorption (in the case of n-octylamine). The amount of amine group is about 0.5-5% and preferably about 0.75-3% and more preferably about 1-2% of the total powder.

E. The unique feature of the present sorbent is the presence of silica coating and amine groups on the surface of carbon. This leads to enhancement in the mercury removal efficiency and $SO_3$-resistance of sorbent, as $SO_3$ reacts with amine groups (acid-base reaction) present on the sorbent, leaving sites which are preferred by mercury for adsorption.

EXAMPLE 1

Synthesis and Performance of 5 Wt % APTS/Activated Carbon-Based Sorbent (HSA-Silica-SM1)

1.a. Surface Modification with Sodium Aluminate

A typical process for introducing aluminum hydroxide groups on the surface of carbon black is as follows: 60 g of activated carbon (surface area: 550 $m^2$/g) was dispersed in 5400 mL of water, using a high shear mixer. 1.2 g of sodium aluminate was dissolved in 360 mL of water, in a separate container. The aqueous solution of sodium aluminate was passed through an ion-exchange resin (Dowex-HCR-W2), prior to the addition to carbon black slurry. The pH of the solution was maintained between 9.7 and 9.8, using an aqueous solution of sodium hydroxide and hydrochloric acid. The treated powder was filtered, and dried in an oven.

1.b. Surface Modification with Sodium Silicate

Aluminum hydroxide activated carbon was further coated with silica. In a typical experiment 25 g of aluminum hydroxide activated carbon was dispersed in 2250 mL of water using a high shear mixer. The temperature of the slurry was maintained between 75-80° C. In a separate container 18.70 g of 28% sodium silicate solution was mixed with 250 mL of water. The sodium silicate solution was treated with ion-exchange resin, and finally added to the activated carbon black, at the rate of 4 mL/min. The pH of the solution was maintained around 4 using aqueous solutions of sodium hydroxide and hydrochloric acid. FIG. 1 shows a micrograph of activated carbon after silica coating. Thermo gravimetric analysis of silica coated carbon black showed that the silica content in the coated powder is 7-8%.

1c. Amine Modification of Silica Coated Activated Carbon

Three different variations of APTS modified metal-oxide coated carbon were synthesized. In a typical experiment, APTS (as 5 wt % of the metal-oxide modified carbon) was dissolved in ethanol, followed by the addition of 5 g of metal-oxide coated carbon, while stirring the solution. Subsequently, acetic acid and water were added for the completion of hydrolysis and condensation reactions. Finally, ethanol was removed and the powder was dried in an oven. In the work described in this invention, ethanol was used as solvent to dissolve APTS due to the ease with which ethanol can be evaporated away in a laboratory. Those skilled in the art will recognize that water can be used instead of ethanol, and water soluble amine precursor compounds can be substituted instead.

1.d Measurement of Mercury Removal Efficiency of HSA-Silica-SM1

Figure 2:
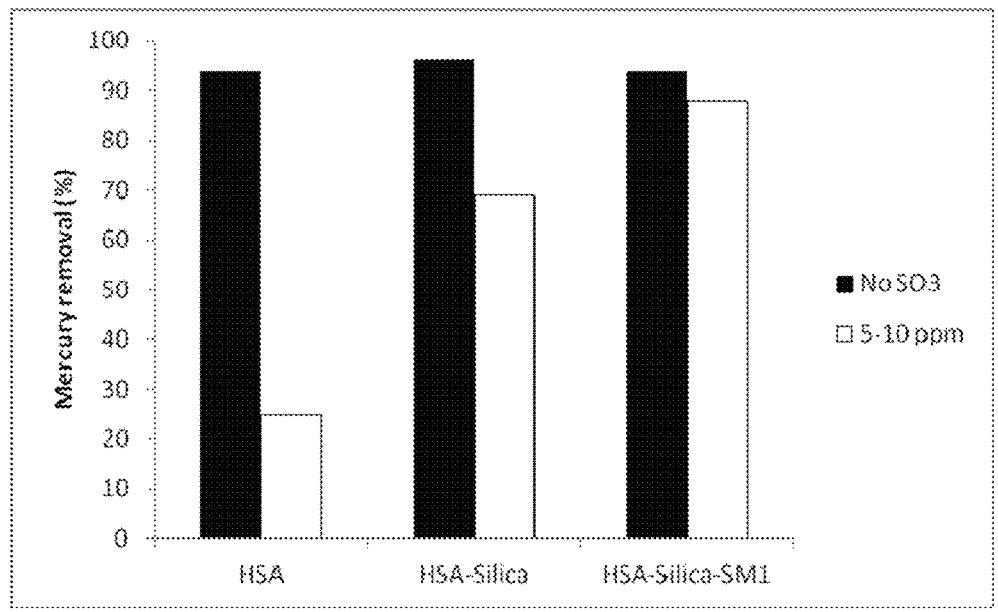
FIG. 2 depicts the mercury removal efficiency of HSA-Silica-SM1, with and without 5-10 ppm $SO_3$ mixed with the flue gas.

The sorbents were tested for total vapor-phase mercury removal in a baghouse scenario for plants burning Powder River Basin sub-bituminous coal (PRB). FIG. 2 shows the performance of the sorbents, with and without $SO_3$. Without the presence of silica and amine the mercury removal efficiency of activated carbon reduces from 94% to 25%, when 5-10 ppm $SO_3$ is introduced (Sample ID: HSA). In the presence of silica, the efficiency reduces from 96% to 69% when 5-10 ppm $SO_3$ is present (Sample ID: HSA-Silica). However, the efficiency of HSA-Silica-SM1 (5 wt % amine) only dropped to 88% in the presence of $SO_3$ from 94% in the absence of $SO_3$.

Figure 3:
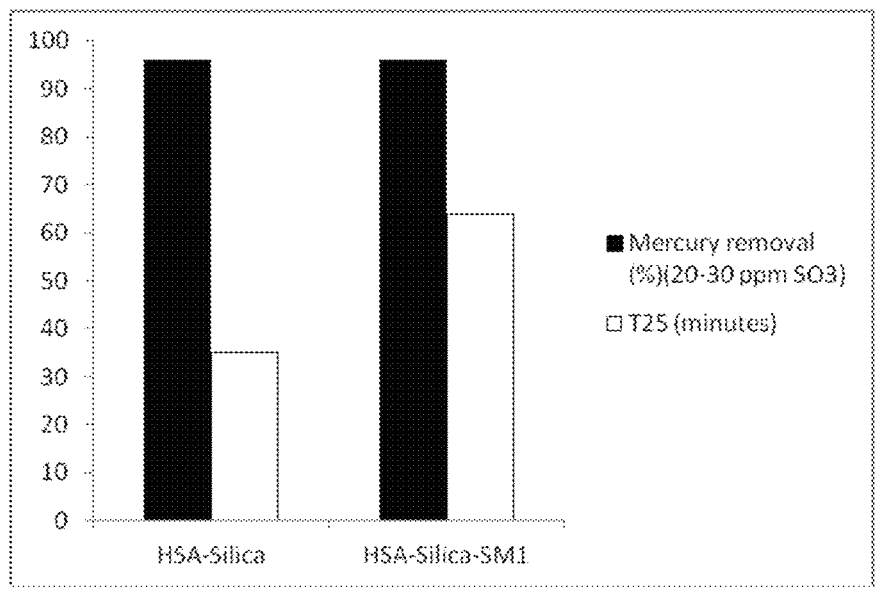
FIG. 3 depicts the mercury removal efficiency (%) and $T_{25}$ (minutes) HSA-Silica-SM1, in the presence of 20-30 ppm $SO_3$.

FIG. 3 shows the mercury removal efficiency and $T_{25}$ ($T_{25}$ denotes the time it took for the flue gas to recover to 25% of the beginning total vapor-phase mercury concentration; $T_{25}$ is an indication of the capacity of the sorbent) of HSA-Silica-SM1 at 20-30 ppm $SO_3$ level in the flue gas. The $T_{25}$ was 64 minutes for HSA-Silica-SM1, compared to 35 minutes for sample which does not contain amine (HSA-Silica), indicating higher mercury removal capacity for HSA-Silica-SM1.

EXAMPLE 2

Synthesis and Performance of 20 Wt % APTS/Activated Carbon-Based Sorbent (HSA-Silica-SM3)

2.a Synthesis of 20 Wt % APTS/Activated Carbon-Based Sorbent

The sorbent was synthesized in a method similar to the method described in Example 1, except the concentration of APTS was increased to 20 wt % of metal oxide coated activated carbon. In a typical experiment, APTS (as 20 wt % of the metal-oxide modified carbon) was dissolved in ethanol, followed by the addition of 5 g of metal-oxide coated carbon, while stirring the solution. Subsequently, acetic acid and water were added for the completion of hydrolysis and condensation reactions. Finally, ethanol was removed and the powder was dried in an oven.

2.b Measurement of Mercury Removal Efficiency of HSA-Silica-SM3

Figure 4:
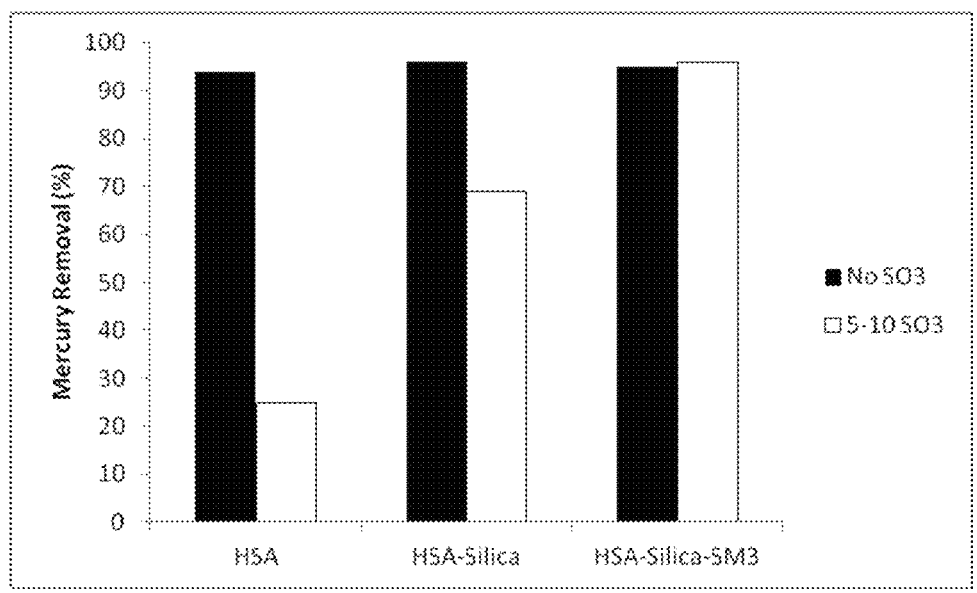
FIG. 4 depicts the mercury removal efficiency of HSA-Silica-SM3, with and without 5-10 ppm $SO_3$ mixed with the flue gas.

The sorbents were characterized similar to the method described in Example 1. FIG. 4 shows the performance of the sorbents, with and without $SO_3$. Without the presence of silica and amine the mercury removal efficiency of activated carbon reduces from 94% to 25%, when 5-10 ppm $SO_3$ is introduced. In the presence of silica, the efficiency reduces from 96% to 69% when 5-10 ppm $SO_3$ is present. However, HSA-Silica-SM3 shows a minimal drop in the mercury removal efficiency when the same amount of $SO_3$ is mixed in the flue gas.

Figure 5:
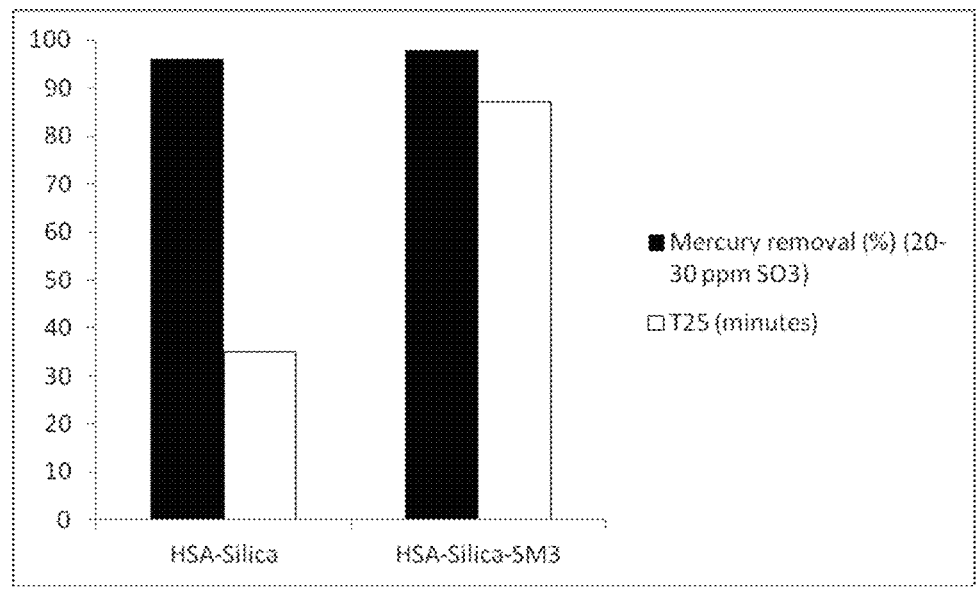
FIG. 5 depicts the mercury removal efficiency (%) and $T_{25}$ (minutes) of HSA-Silica-SM3, in the presence of 20-30 ppm $SO_3$.

FIG. 5 shows the mercury removal efficiency and $T_{25}$ of HSA-Silica-SM3 at 20-30 ppm $SO_3$ level in the flue gas. The $T_{25}$ was 87 minutes in the case HSA-Silica-SM3 (20 wt % amine) compared to the sample which does not contain amine (HSA-Silica).

Figure 6:
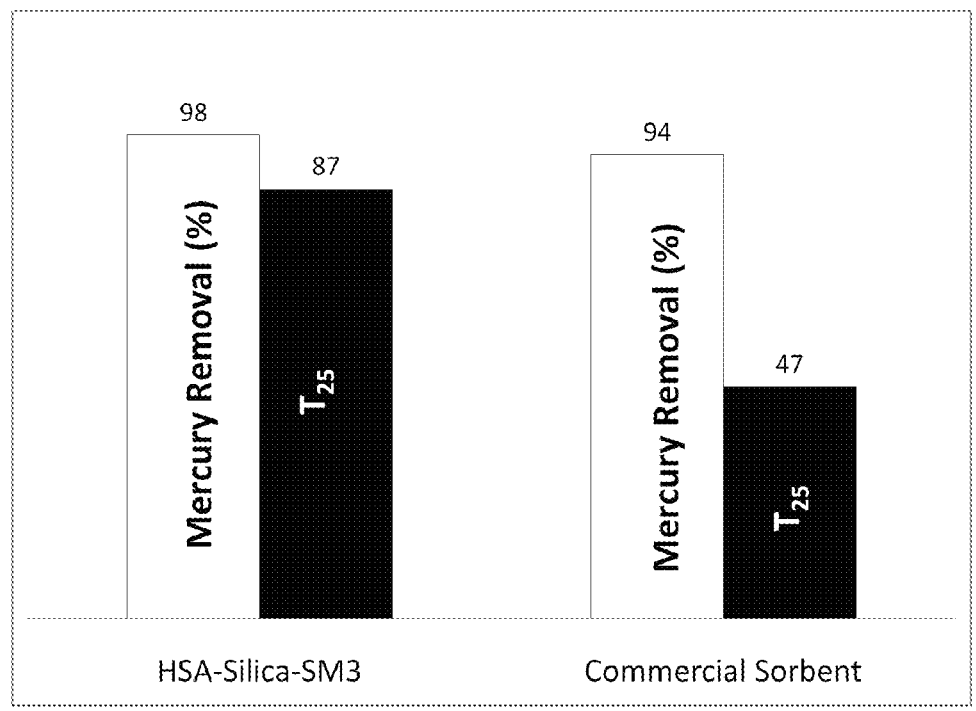
FIG. 6 depicts the performance of HSA-Silica-SM3, compared to a commercial sorbent, in the presence of 20-30 ppm $SO_3$

FIG. 6 compares the mercury removal efficiency and $T_{25}$ of HSA-Silica-SM3 and a commercial sorbent in the presence of 20-30 ppm of $SO_3$. The initial mercury removal efficiency was comparable; however, the $T_{25}$ of HSA-Silica-SM3 was almost two times that of the commercial sorbent (87 minutes for HSA-Silica-SM3 vs. 47 minutes for commercial sorbent). This indicates that the NEI sorbent is more $SO_3$ resistant than the commercial sorbent compared in this study.

Figure 7:
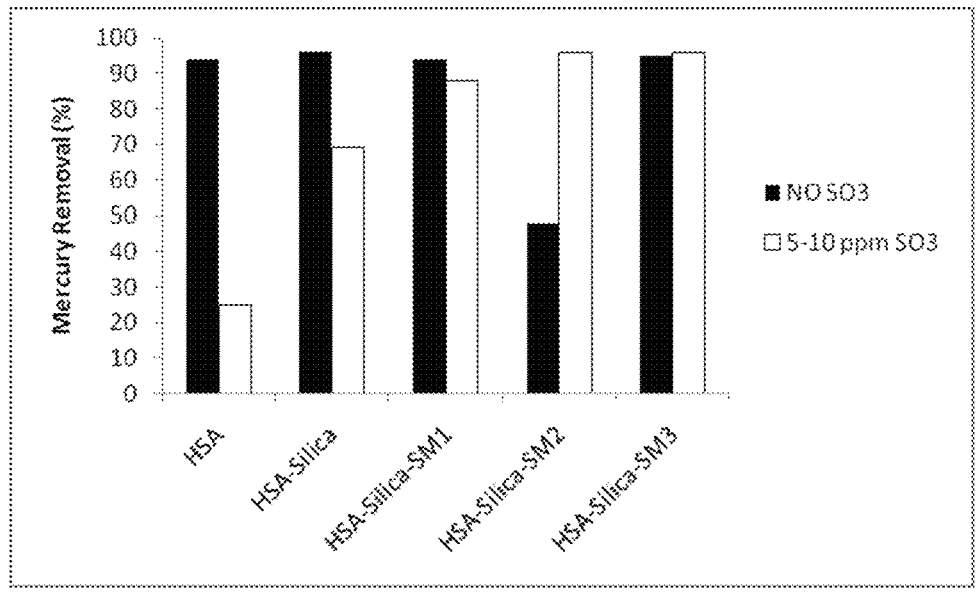
FIG. 7 depicts the mercury removal efficiency of various sorbents, with and without 5-10 ppm $SO_3$ mixed with the flue gas.
Figure 8:
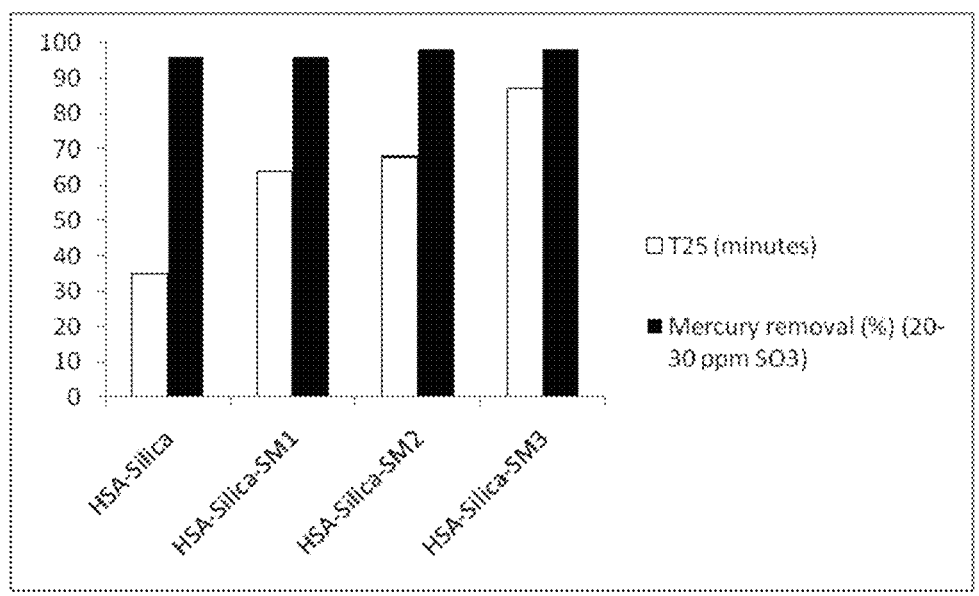
FIG. 8 depicts the mercury removal efficiency (%) and $T_{25}$ (minutes) of various NEI sorbents in the presence of 20-30 ppm $SO_3$.

Table I summarize the various samples synthesized for analysis. FIGS. 7 and 8 summarize the performance of these sorbents, indicating superior performance of sorbents containing amine, compared to sorbents which do not have amine.

TABLE I

Description of various samples synthesized using the procedure outlined above.

| Sample ID | Sample Description | APTS used (% of metal oxide coated carbon) |
|---|---|---|
| HSA | As received activated carbon | N/A |
| HSA-Silica | Activated carbon modified with silica | N/A |
| HSA-Silica-SM1 | Activated carbon modified with silica and amine | 5 |
| HSA-Silica-SM2 | Activated carbon modified with silica and amine | 10 |
| HSA-Silica-SM3 | Activated carbon modified with silica and amine | 20 |

As is well known for formula parameters set forth herein are for example only, such parameters can be scaled and adjusted in accordance with the teaching of this invention. This invention has been described with respect to preferred embodiments. However, those skilled in the art will recognize, modification and variations in the specific details which have been described and illustrated may be restored to without departing from the spirit and scope of the invention as defined in the appended claims.

We claim:

1. A sorbent to remove mercury from a gas in the presence of $SO_3$, comprising:
   a) an inorganic substrate;
   b) a tie layer deposited on the surface of the substrate, said tie layer comprising at least one of: aluminum hydroxide, titanium hydroxide, magnesium hydroxide, iron hydroxide and copper hydroxide;
   c) a metal oxide layer on the tie layer; and
   d) a amine based compound bonded to the metal oxide layer.

2. The sorbent as claimed in claim 1 wherein said substrate is comprised of at least one of ceramic oxides, ceramic non-oxides, and clay-based particles.

3. The sorbent as claimed in claim 1, wherein said metal oxide layer comprises at least one of silicon oxide, aluminum oxide, titanium oxide, iron oxide and tin oxide.

4. The sorbent as claimed in claim 1, wherein said metal oxide layer further includes amine molecules to increase its resistance to $SO_3$ poisoning.

5. The sorbent as claimed in claim 4, wherein said amine molecules comprise at least one of: aminosilane, aromatic amine and aliphatic amine.

6. The sorbent as claimed in claim 1, wherein the concentration of metal oxide layer comprises 7-16 wt %, of the total sorbent.

7. An improved carbon based sorbent to remove mercury from flue gas in the presence of $SO_3$, comprising:
   a) a carbon substrate;
   b) a tie layer deposited on the surface of the carbon substrate, said tie layer comprising at least one of: aluminum hydroxide, titanium hydroxide, magnesium hydroxide, iron hydroxide and copper hydroxide;
   c) a metal oxide layer deposited on the tie layer; and
   d) amine based compound bonded to the metal oxide layer.

8. The sorbent as claimed in claim 7 wherein said carbon substrate comprises activated carbon.

9. The sorbent as claimed in claim 7, wherein said metal oxide layer comprises at least one of silicon oxide, aluminum oxide, titanium oxide, iron oxide and tin oxide.

10. The sorbent as claimed in claim 7, wherein said metal oxide layer further includes amine molecules to increase its resistance to $SO_3$ poisoning.

11. The sorbent as claimed in claim 10, wherein said amine molecules comprise at least one of: aminosilane, aromatic amine and aliphatic amine.

12. The sorbent as claimed in claim 7, wherein the concentration of metal oxide layer comprises 7-16%, of the total sorbent.

13. A process for producing a sorbent to remove mercury from gas in the presence of SO3, comprising:
   a) providing an inorganic substrate;
   b) depositing a tie layer on the inorganic substrate, said tie layer comprising at least one of: aluminum hydroxide, titanium hydroxide, magnesium hydroxide, iron hydroxide and copper hydroxide;
   c) depositing a metal oxide layer on the tie layer;
   d) functionalizing the metal oxide layer with an amine based compound.

14. The process as claimed in claim 13, wherein said inorganic substrate comprises activated carbon.

15. The process as claimed in claim 13, wherein said metal oxide layer comprises silica.

16. The process as claimed in claim 13, wherein said amine based compound comprises aminosilane.

* * * * *